United States Patent Office 3,567,726
Patented Mar. 2, 1971

3,567,726
SYNTHESIS OF β,β-DI-ALKYL PYRROLIDINES
Robert D. Dillard and Nelson R. Easton, Indianapolis, Ind., assignors to Eli Lilly and Company, Indianapolis, Ind.
No Drawing. Application July 12, 1967, Ser. No. 652,690, now Patent No. 3,452,015, dated June 24, 1969, which is a continuation-in-part of application Ser. No. 311,305, Sept. 25, 1963. Divided and this application Dec. 18, 1968, Ser. No. 810,875
Int. Cl. G07d 51/76
U.S. Cl. 260—250
1 Claim

ABSTRACT OF THE DISCLOSURE

A propargyl is semi-hydrogenated to the corresponding allyl malonate which is hydrolyzed to the malonic acid. Decarboxylation of the acid is readily effected by heat, resulting in the production of an unsaturated acid which is readily cyclized to a 4-methyl-gamma lactone. The latter is converted to 2-methyl-beta,beta-substituted pyrrolidines via the corresponding 5-methyl-2-pyrrolidones.

CROSS REFERENCE

This application is a division of S.N. 652,690, filed July 12, 1967, now Pat. No. 3,452,015, issued June 24, 1969, which in turn is a continuation-in-part of application Ser. No. 311,305, filed Sept. 25, 1963, now abandoned.

BACKGROUND OF THE INVENTION

Prior art methods of synthesizing pyrrolidines include the hydrogenation of a pyrrole, as exemplified in Andrews and McElvain, J. Am. Chem. Soc. 51, 887 (1929), reduction of the corresponding pyrrolidone as exemplified in the work of Pernot et al., Bull. Soc. Chim. Fr. 1953, 324, the reduction of a succinimide as exemplified in Rice et al., J. Org. Chem. 19, 884 (1959) and by the self-condensation of a δ-haloalkylamine. This last method has been applied to the preparation of β-substituted pyrrolidines by Brown and van Gulick, J. Am. Chem. Soc. 77, 1083 (1955).

SUMMARY

The process provided by this invention is a multi-step process, the first step of which involves the hydrolysis of a propargyl-malonate to the corresponding dicarboxylic acid which is then cyclized to form a carboxyhydroxypentanolactone. Opening of the lactone ring with the concomitant decarboxylation of one of the carboxyl groups yields directly a γ-keto acid. This γ-keto acid upon reaction with ammonia forms a methylenepyrrolidone. Hydrogenation of this compound, first catalytically, and then with a chemical reducing agent such as lithium aluminum hydride, yields the desired α-methyl-β,β-di-alkyl-substituted pyrrolidine.

The above process can be better visualized by reference to Reaction Scheme 1 below:

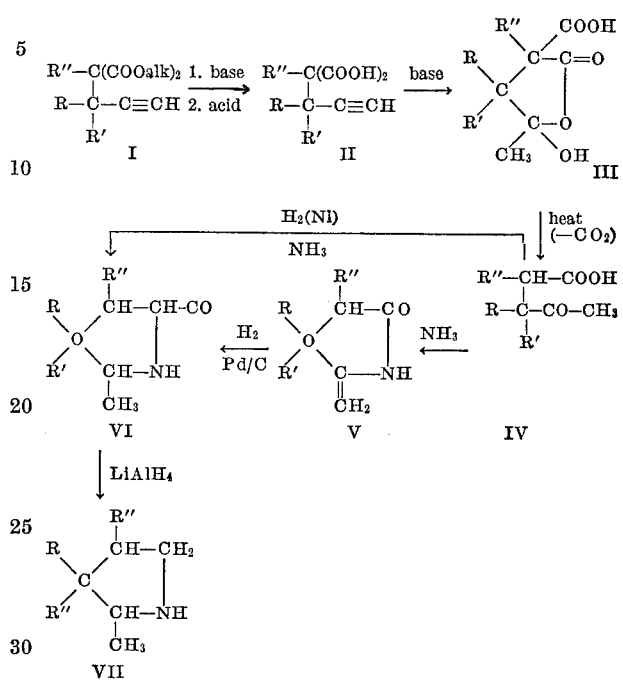

Reaction Scheme 1 wherein
R and R', when taken separately, are members of the group consisting of $C_1$–$C_8$ alkyl and $C_3$–$C_8$ cycloalkyl;
R and R', when taken together with the carbon atom which they are attached, represent a $C_3$–$C_8$ cycloalkyl group;
R" is a member of the group consisting of hydrogen, $C_1$–$C_8$ alkyl, $C_3$–$C_8$ cycloalkyl, monocyclic aromatic and monocyclic aromatic-substituted $C_1$–$C_8$ alkyl; and,
Alk is a $C_1$–$C_8$ alkyl group.

According to the above reaction scheme, a propargyl-substituted malonic ester (I) is hydrolyzed under mild basic conditions to yield the corresponding dicarboxylic acid (II). Treatment of the di-acid (II) with base results in the formation of a hydroxycarboxylactone (III). Upon heating, the lactone ring of this compound opens with the concomitant loss of carbon dioxide to give a β,β-di-substituted levulinic acid (IV), treatment of which with ammonia results in the formation of a methylenepyrrolidone (V). Catalytic hydrogenation of the pyrrolidone using a noble metal catalyst such as platinum oxide yields the corresponding α-methyl-β,β-di-substituted pyrrolidone (VI). These last two operations can be telescoped into a single process whereby the keto acid (IV) is hydrogenated over a metal catalyst such as Raney nickel in the presence of ammonia to yield the α-methylpyrrolidone directly. Finally, reduction of the α-methyl-β,β-di-substituted pyrrolidone, for example with a metal hydride reducing agent such as lithium aluminum hydride, yields the desired β,β-di-alkyl-substituted pyrrolidine (VI).

An alternative synthetic pathway is provided by this invention for the preparation of the β,β-di-substituted pyrrolidone (VI). This pathway is set forth in Reaction Scheme 2 below:

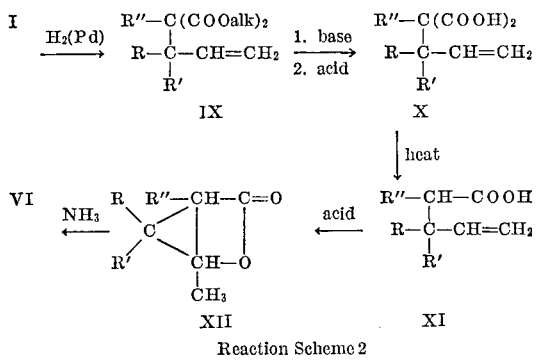

Reaction Scheme 2 wherein R, R', R", and alk have the same meaning as hereinabove.

According to Reaction Scheme 2, a propargyl-substituted di-alkyl malonate (I in Reaction Scheme 1) is semi-hydrogenated catalytically using a palladium catalyst to yield the corresponding allyl-substituted di-alkyl malonate (IX). Basic hydrolysis of this compound yields the corresponding allyl-substituted malonic acid (X). [This latter compound can also be prepared by an alternative procedure which involves the semi-hydrogenation of the propargyl-substituted malonic acid (II from Reaction Scheme 1)]. Decarboxylation of the malonic acid is readily effected by heat, resulting in the production of an unsaturated acid (XI), which readily cyclizes to yield the corresponding lactone (XII). Treatment of the lactone (XII) with ammonia yields the desired β,β-di-alkyl-substituted pyrrolidone, (VIII).

In the above reaction schemes, when R, R', and R" represent $C_1-C_8$ alkyl or $C_3-C_8$ cycloalkyl or R and R' taken together, form a $C_3-C_8$ cycloalkyl group, they can be illustratively: methyl, ethyl, n-propyl, isopropyl, sec.-butyl, n-butyl, isobutyl, iso-amyl, t-amyl, n-amyl, 2-pentyl, 3-pentyl, 3-methyl-2-butyl, 2-hexyl, 1-hexyl, 3-hexyl, 4-methyl-1-pentyl, 3 - methyl - 1 - pentyl, 3-methyl-2-pentyl, neopentyl, 3,3-dimethyl-1-butyl, 3,3-dimethyl - 1 - pentyl, 3,3,4-trimethyl-1-pentyl, 2,2,4-trimethyl - 1 - pentyl, 2,4,4-dimethyl-2-pentyl, iso-octyl, isoheptyl, n-heptyl, 2-heptyl, 3-heptyl, 4-heptyl, 2-octyl, 3-octyl, 4-octyl, cyclopropyl, cyclobutyl, cyclopentyl, cycloheptyl, cyclohexyl, cyclooctyl, 3-methylcyclohexyl, 2,2-dimethylcyclopentyl, and the like. R" can represent a monocyclic aromatic group or a monocyclic aromatic substituted $C_1-C_8$ alkyl group. The term monocyclic aromatic includes such radicals as phenyl, 2-pyridyl, 3-pyridyl, 4-pyridyl, 2-thienyl, 3-thienyl, 2-furyl, 3-furyl, 2-pyrimidyl, 4-pyrimidyl, 2-pyrrolyl, 2-pyrazinyl, 3-pyrazinyl, 5-thiazolyl, 2-imidazolyl, 5-tetrazoyl, 3-pyrazolyl, 4-isoxazolyl and 4-imidazolyl. Each of the above groups is derived from an organic monocyclic radical which satisfies the standard criteria for aromaticity. These criteria are (1) that the ring system contain (4N+2) pi electrons and (2), in the case of bicyclic systems, that the rings are planar. These concepts of aromaticity are fully set forth in articles by Wilson Baker, Perspectives in Organic Chemistry, 1956; by Robert Breslow, On Aromatic Character, Chemistry and Engineering News, page 90, June 28, 1965; and by Hückel in his treatise, Theoretische Grundlagen der Organischen Chemie, 2. Auflage, 1. Band, Akademische Verlagsgesellschaft m.b.H., Leipzig 1934. In addition, the term "monocyclic aromatic" includes any of the above ring systems when substituted with a standard substituting group such as lower alkyl, lower alkoxy, amino, lower alkylamino, di-lower alkylamino, halogen, nitro, and the like. In the above substituent groups, the term "lower alkyl" is meant to include those radicals having from 1–3 carbon atoms in the alkyl chain. The term "halogen" includes all members of the seventh main group of the periodic system. In addition, any given aromatic ring can contain more than one of the above substituting groups. The following radicals will serve to illustrate substituted aromatic groups falling within the definition of the term as used herein; 2-chloro - 3 - furyl, 2 - chloro-5-thienyl, o-tolyl, p-dimethylaminophenyl, 4-amino-2-pyridyl, p-trifluoromethylphenyl, m-(di-n-propylamino)phenyl, p-anisyl, m-ethoxy-p-bromophenyl, p-iodophenyl, 3-n-propoxy-2-pyridyl, p-isopropoxyphenyl, 2,4 - dimethylphenyl, 3,4 - methylenedioxyphenyl, 2-chloro-4-nitrophenyl, and the like. Groups illustrating the scope of R" when it is monocyclic aromatic are set forth above. Groups illustrating the scope of R" when it represents monocyclic aromatic substituted $C_1-C_8$ include benzyl, phenethyl, 3-(2-phenyl)octyl, furfuryl, 3-(2-pyridyl)-n-pentyl, 2-pyrimidylmethyl, 2-methyl-2-phenylethyl, 3-(5-thiazolyl)-n-propyl, 4-(2-imidazolyl)isoheptyl, 6-(3-pyrazolyl)-n-hexyl, 2-(4-imidazolyl)ethyl and the like.

Considering Reaction Scheme 1 above in more detail, the hydrolysis of a propargyl-substituted malonic ester (I) usually requires only mild alkaline conditions for its completion. However, the reaction whereby the malonic acid (II) or malonic ester (I) is converted to the lactone (III) whereby the acetylenic bond is hydrated, requires somewhat more stringent conditions, for example, refluxing overnight with 10 percent sodium hydroxide. The resulting lactone is customarily isolated by acidifying the reaction mixture and extracting the lactone with a water-immiscible organic solvent. The conversion of the lactone to the substituted levulinic acid (IV) takes place under standard decarboxylation reaction conditions; that is to say, the lactone is simply heated until the evolution of carbon dioxide ceases, at which time the reaction is substantially complete. An organic solvent can be used here if desired. Conversion of the levulinic acid to the methylenepyrrolidone (V) is usually carried out in an autoclave using an excess of ammonia. The reduction of the methylene group to a methyl group, whether carried out in an atmosphere of hydrogen only or with added ammonia, normally requires only the use of a low pressure hydrogenation apparatus and a noble metal catalyst such as platinum oxide, palladium-on-carbon, etc. It is possible, however, to employ high pressure hydrogenation conditions using a less active catalyst such as Raney nickel. When the levulinic acid is converted directly to the methylpyrrolidone (VI), we prefer to employ high pressure hydrogenation conditions with an excess of ammonia present and Raney nickel as a catalyst. Finally, the reduction of the methylpyrrolidone (VI) to the corresponding pyrrolidine (VII) is preferably carried out using lithium aluminum hydride in an ethereal solvent. Other metal hydride reducing agents such as sodium aluminum hydride, sodium borohydride, and the like, can also be employed.

Considering Reaction Scheme 2 in more detail, the reduction of the propargyl-substituted malonic ester (I) is readily carried out using low pressure hydrogenation conditions and a noble metal catalyst such as palladium-on-carbon or platinum oxide. The hydrolysis of the allyl-substituted malonic ester (IX) thus formed to the corresponding acid is accomplished by using about 10 percent alkali and the allyl malonic acid (X) is obtained from the hydrolysis mixture by acidification followed by extraction of the acid into a water-immiscible organic solvent. Decarboxylation of the allyl malonic acid (X) to yield an unsaturated acid (XI) is carried out by simply heating the acid, either alone or in an inert solvent. Conversion of the acid (XI) into the corresponding lactone (XII) is readily accomplished by treating the unsaturated acid with a mineral acid such as concentrated sulfuric acid for a short period of time and then extracting the resulting lactone into ether. Conversion of the lactone of the corresponding α-methyl-2-pyrrolidone is brought about by heating the lactone in an autoclave with an excess of aqueous ammonia.

The substituted pyrrolidines which are the ultimate products of the novel processes of this invention, containing as they do two alkyl substituents on a carbon β to the ring nitrogen, represent a class of compounds which have been synthesized only with difficulty in the past. The large variety of substituents which R and R' can represent also lends a versatility and scope to the process of this invention, a versatility and scope not found in those processes of the prior art useful for the synthesis of β,β-dialkyl pyrrolidines. The pyrrolidines themselves, of course, are useful in the same ways that the parent compound and its mono-alkyl substitution products have been used in the past, such as drug intermediates, solvents, corrosion inhibitors, and the like.

This invention is further illustrated by the following specific examples:

EXAMPLE 1

2-carboxy-3,3-dimethyl-4-hydroxy-4-pentanolactone

A mixture of 17 g. of diethyl 1,1-dimethylpropargylmalonate [prepared by the method of O. K. Behrens et al., J. Biol. Chem. 175, 788 (1948)] and 200 ml. of 10 percent sodium hydroxide was refluxed overnight, and was then evaporated to dryness in vacuo. The resulting residue was dissolved in water. The aqueous solution was cooled to about 15° C. and was made acidic with 12 N hydrochloric acid, thus forming 2-carbox-3,3-dimethyl-4-hydroxy-4-pentanolactone which was extracted from the acidic aqueous layer by ether followed by chloroform. The organic extracts were separated, and the organic solvent was removed by evaporation in vacuo. Crystallization of the resulting residue from a mixture of ether and hexane yielded 2-carboxy-3,3-dimethyl - 4 - hydroxy-4-pentanolactone melting at about 118–122° C.

*Analysis.*—Calcd. (percent): C, 51.06; H, 6.43. Found (percent): C, 51.09; H, 6.37.

Following the above procedure, 2-carboxy - 2 - ethyl-3,3-dimethyl-4-hydroxy-4-pentanolactone was prepared from diethyl ethyl - 1,1 - dimethylpropargylmalonate. The compound melted at about 152–153° C.

*Analysis.*—Calcd. (percent): C, 55.54; H, 7.64. Found (percent): C, 55.60; H, 7.63.

EXAMPLE 2

3,3-dimethyllevulinic acid

Twenty-five grams of 2-carboxy-3,3-dimethyl-4-hydroxy-4-pentanolactone were heated at 155° C. for one hour thus forming 3,3-dimethyllevulinic acid which was purified by distillation. The compound boiled at about 79° C./0.02 mm. Hg.

*Analysis.*—Calcd. (percent): C, 58.31; H, 8.39. Found (percent): C, 58.41; H, 8.54.

Following the above procedure, 2-ethyl-3,3-dimethyllevulinic acid was prepared from 3-carboxy-3-ethyl-4,4,5-trimethyl-5-hydroxy-2-furanone. It boiled in the range 84–85° C./0.1 mm. Hg.

*Analysis.*—Calcd. (percent): C, 62.76; H, 9.36. Found (percent): C, 62.66; H, 9.36.

EXAMPLE 3

4,4-dimethyl-5-methylene-2-pyrrolidone

A mixture of 26 g. of 3,3-dimethyllevulinic acid, 50 ml. of ethanol, and an excess of ammonia was heated in an autoclave at about 185° C. for about 5 hours. The volatile constituents of the mixture were removed in vacuo and the resulting residue comprising 4,4-dimethyl-5-methylene-2-pyrrolidone was purified by distillation. The compound boiled in the range 110–115° C./4 mm. Hg. The distillate solidified upon standing, yielding crystalline 4,4-dimethyl-5-methylene-2-pyrrolidone which melted at about 72–74° C. after recrystallization from pentane.

*Analysis.*—Calcd. (percent): C, 67.17; H, 8.85. Found (percent): 66.91; H, 8.82.

EXAMPLE 4

4,4,5-trimethyl-2-pyrrolidone

A mixture of 70 g. of 3,3-dimethyllevulinic acid, 10 g. of Raney nickel, 500 ml. of ethanol and an excess of ammonia was heated in a high pressure hydrogenation bomb at about 135° C. for about 5 hours at a hydrogen pressure of 2000 p.s.i. The catalyst was removed by filtration and the ethanol and ammonia were removed from the filtrate by evaporation in vacuo. The resulting residue, comprising 4,4,5-trimethyl-2-pyrrolidone, was purified by distillation; the compound distilled at about 85° C./0.2 mm. Hg.

*Analysis.*—Calcd.: N, 11.01%. Found: N, 10.94%.

4,4,5-trimethyl-2-pyrrolidone was also prepared from the corresponding methylene compound of Example 3 in the following manner: 5 g. of 4,4-dimethyl-5-methylene-2-pyrrolidone and 0.5 g. of 5 percent palladium-on-carbon were mixed with 150 ml. of ethanol, and the mixture was hydrogenated at 40 p.s.i. until the theoretical quantity of hydrogen had been absorbed. The catalyst was removed by filtration and the filtrate evaporated to dryness in vacuo. The residue, comprising 4,4,5-trimethyl-2-pyrrolidone, was purified by distillation as before.

EXAMPLE 5

2,3,3-trimethylpyrrolidine

Four g. of 4,4,5-trimethylpyrrolidone were reduced by means of 2.3 g. of lithium aluminum hydride in 250 ml. of di-ethyl ether. After completion of the reaction, the reaction mixture was treated with 20 percent aqueous sodium hydroxide to destroy the excess reducing agent. The ether layer was separated, dried, and the ether removed by evaporation in vacuo. The resulting residue was distilled and 2,3,3-trimethylpyrrolidine boiled at about 65° C./85 mm. Hg.

The hydrochloride salt of 2,3,3-trimethylpyrrolidine was prepared by dissolving the free base in ethyl acetate and then saturating the resulting solution with gaseous hydrogen chloride. 2,3,3-trimethylpyrrolidine hydrochloride, thus prepared, melted at about 148–150° C. after recrystallization from ethyl acetate.

*Analysis.*—Calcd. (percent): C, 56.17; H, 10.78. Found (percent): C, 56.03; H, 10.82.

EXAMPLE 6

Di-ethyl 1,1-dimethylallylmalonate

Two hundred twenty-six grams of di-ethyl 1,1-dimethylpropargylmalonate were hydrogenated in hexane solution at a hydrogen pressure of 40 p.s.i. over a 5 percent palladium-on-carbon catalyst. After the theoretical quantity of hydrogen had been absorbed, the catalyst was removed by filtration and the filtrate was concentrated by evaporation in vacuo. The resulting residue consisted of di-ethyl 1,1-dimethylallylmalonate which was purified by distillation. Di-ethyl 1,1-dimethylallylmalonate distilled in the range 52–54° C./0.05 mm. Hg.

*Analysis.*—Calcd. (percent): C, 63.13; H, 8.83. Found (percent): C, 63.06; H, 8.73.

EXAMPLE 7

1,1-dimethylallylmalonic acid

A flask containing 180 g. of di-ethyl 1,1-dimethylallylmalonate, 128 g. of sodium hydroxide, and 1000 ml. of water was heated at refluxing temperature overnight. The reaction mixture was then concentrated by evaporation in vacuo and the resulting concentrate, upon acidification with 12 N hydrochloric acid, yielded about 1500 ml. of a clear solution. 1,1-dimethylallylmalonic acid crystallized from the solution on standing and melted at about 104–106° C., after recrystallization from a mixture of benzene and ethyl acetate.

*Analysis.*—Calcd. (percent): C, 55.80, H, 7.03. Found (percent) C, 55.54; H, 7.12.

EXAMPLE 8

3,3-dimethyl-4-pentenoic acid

Eighty-five grams of 1,1-dimethylallylmalonic acid were heated at about 157° C. for three hours, thus forming 3,3-dimethyl-4-pentenoic acid by decarboxylation. The reaction mixture was filtered and the filtrate was distilled. 3,3-dimethyl-4-pentenoic acid boiled in the range 47–48° C./0.1 mm. Hg; $n^D_{25}=1.423$.

*Analysis.*—Calcd. (percent): C, 65.59; H, 9.44. Found (percent): C, 65.55; H, 9.60.

EXAMPLE 9

3,3-dimethyl-4-pentanolactone

Ten grams of 3,3-dimethyl-4-pentenoic acid were stirred with 50 ml. of 18 M sulfuric acid for about 10 minutes, and the acidic solution was then poured over 200 g. of ice. 3,3-dimethyl-4-pentanolactone formed in the above reaction was extracted therefrom with ether. The ether solution was separated and dried, and the ether removed by evaporation in vacuo. Distillation of the residue yielded 3,3-dimethyl-4-pentanolactone boiling at about 50° C./0.5 mm. Hg.

*Analysis.*—Calcd. (percent): C, 65.59; H, 9.44. Found (percent): C, 65.53; H, 9.71.

EXAMPLE 10

4,4,5-trimethyl-3-phenylpyrrolidone 2-phenylmalonic ester was alkynylated with 3-chloro-3-methyl-1-butyne by the method of O. K. Behrens et al. (loc. cit.) to yield diethyl 2-(1,1-dimethylpropargyl)-2-phenylmalonate. This compound was converted by the method of Example 1 to 2-carboxy-2-phenyl-3,3-dimethyl-4-hydroxy-4-pentanolactone which spontaneously decarboxylated to yield 3,3 - dimethyl-2-phenyllevulinic acid. M.P.=141–143° C.

*Analysis.*—Calcd. (percent): C, 70.88; H, 7.32. Found (percent): C, 70.83; H, 7.44.

Reductive ammination of the latter compound by the procedure of Example 4 yielded 4,4,5-trimethyl-3-phenylpyrrolidone, M.P.=198–200° C.

*Analysis.*—Calcd. (percent): C, 76.81; H, 8.43; N, 6.84. Found (percent): C, 77.00; H, 8.44; N, 6.95.

4,4,5-trimethyl-3-phenylpyrrolidone thus prepared is readily reduced by the process of Example 5 to 2,3,3-trimethyl-4-phenylpyrrolidine.

3,3-dimethyl-2-phenyllevulinic acid can also be converted by the procedure of Example 3 to 4,4-dimethyl-5-methylene-3-phenylpyrrolidone, which compound can in turn be reduced to the corresponding 4,4,5-trimethyl derivative.

EXAMPLE 11

3-phenethyl-4,4,5-trimethyl-2-pyrrolidone 3-phenethylmalonic ester was alkynylated with 3-chloro-3-methyl-1-butyne by the method of O. K. Behrens et al. (loc. cit.) to yield diethyl 2-(1,1-dimethylpropargyl)-2-phenethylmalonate. This compound was converted by the method of Example 1 to 2-carboxy-3-phenethyl-3,3-dimethyl-4-hydroxy-4-pentanolactone, which compound was in turn converted by the method of Example 2 to 3,3-dimethyl-2-phenethyllevulinic acid. Reductive ammination of the latter compound by the procedure of Example 4 yielded 3-phenethyl-4,4,5-trimethyl-2-pyrrolidone.

3-phenethyl - 4,4,5 - trimethyl-2-pyrrolidone thus prepared is readily reduced by the process of Example 5 to 2,3,3-trimethyl-4-phenethylpyrrolidine.

3,3-dimethyl-2-phenethyllevulinic acid can also be converted by the procedure of Example 3 to 4,4-dimethyl-5-methylene-3-phenethylpyrrolidone, which compound can in turn be reduced to the corresponding 4,4,5-trimethyl derivative.

EXAMPLE 12

3-benzyl-4,4,5-trimethyl-2-pyrrolidone 2-benzylmalonic ester was alkynylated with 3-chloro-3-methyl-1-butyne by the method of O. K. Behrens et al. (loc. cit.) to yield diethyl 2-(1,1-dimethylpropargyl)-2-benzylmalonate. This compound was converted by the method of Example 1 to 2-carboxy-2-benzyl-3,3-dimethyl-4-hydroxy-4-pentanolactone, M. P.=145–147° C.

*Analysis.*—Calcd. (percent): C, 64.73; H, 6.52. Found (percent): C, 64.57; H, 6.59.

The pentanolactone was in turn converted by the method of Example 2 to 3,3-dimethyl-2-benzyllevulinic acid. Reductive ammination of the latter compound by the procedure of Example 4 yielded 3-benzyl-4,4,5-trimethyl-2-pyrrolidone.

3-benzyl-4,4,5-trimethyl - 2 - pyrrolidone thus prepared is readily reduced by the process of Example 5 to 2,3,3-trimethyl-4-benzylpyrrolidine.

3,3-dimethyl-2-benzyllevulinic acid can also be converted by the procedure of Example 3 to 4,4-dimethyl-5-methylene-2-benzylpyrrolidone which compound can in turn be reduced to the corresponding 4,4,5-trimethyl derivative.

EXAMPLE 13

3-(2-pyridylethyl)-4,4,5-trimethyl-2-pyrrolidone 2-(2-pyridylethyl)malonic ester was alkynylated with 3-chloro-3-methyl-1-butyne by the method of O. K. Behrens et al. (loc. cit.) to yield diethyl 2-(1,1-dimethylpropargyl)-2-(2-pyridylethyl)malonate. This compound was converted by the method of Example 1 to 2-carboxy-2-(2-pyridylethyl)-3,3-dimethyl - 4 - hydroxy-4-pentanolactone, which compound was in turn converted by the method of Example 2 to 3,3-dimethyl-2-(2-pyridylethyl)levulinic acid. Reductive ammination of the latter compound by the procedure of Example 4 yielded 3-(2-pyridylethyl)-4,4,5-trimethyl-2-pyrrolidone.

3 - (2 - pyridylethyl)-4,4,5-trimethyl-2-pyrrolidone thus prepared is readily reduced by the process of Example 5 to 2,3,3-trimethyl-4-(2-pyridylethyl)pyrrolidine.

3,3-dimethyl-2-(2-pyridylethyl)levulinic acid can also be converted by the procedure of Example 3 to 4,4-dimethyl-5-methylene-3-(2-pyridylethyl)pyrrolidone which compound can in turn be reduced to the corresponding 4,4,5-trimethyl derivative.

EXAMPLE 14

3-(2-thienylmethyl)-4-4,5-trimethyl-2-pyrrolidone 2-(2-thienylmethyl)malonic ester was alkynylated with 3-chloro-3-methyl-1-butyne by the method of O. K. Behrens et al. (loc. cit.) to yield diethyl 2-(1,1-dimethylpropargyl)-2-(2-thienylmethyl)malonate. This compound was converted by the method of Example 1 to 2-carboxy-2 - (2 - thienylmethyl)-3,3-dimethyl-4-hydroxy-4-pentanolactone, which compound was in turn converted by the method of Example 2 to 3,3-dimethyl-2-(2-thienylmethyl)levulinic acid. Reductive ammination of the latter compound by the procedure of Example 4 yielded 3-(2-thienylmethyl)-4,4,5-trimethyl-2-pyrrolidone.

3-(2-thienylmethyl)-4,4,5-trimethyl-2-pyrrolidone thus prepared is readily reduced by the process of Example 5 to 2,3,3-trimethyl-4-(2-thienylmethyl)pyrrolidine.

3,3-dimethyl-2-(2-thienylmethyl)levulinic acid can also be converted by the procedure of Example 3 to 4,4-dimethyl - 5-methylene-3-(2-thienylmethyl)-2-pyrrolidone, which compound can in turn be reduced to the corresponding 4,4,5-trimethyl derivative.

The procedures of Examples 1–5 above can be used to prepare the following compounds:

3-(4-pyridyl)-4,4,5-trimethyl-2-pyrrolidone

Starting material: diethyl 2-(1,1-dimethylpropargyl)-2-(4-pyridyl)malonate

Intermediates:

2 - carboxy-2-(4-pyridyl)-3,3-dimethyl-4-hydroxy-4-pentanolactone
3,3-dimethyl-2-(4-pyridyl)levulinic acid
4,4-dimethyl-5-methylene-3-(4-pyridyl)pyrrolidone 3-(3-pyrazolyl)-4,4,5-trimethyl-2-pyrrolidone Starting material: diethyl 2-(1,1-dimethylpropargyl)-2-(3-pyrazolyl)malonate
Intermediates:
2 - carboxy-2-(3-pyrazolyl)-3,3-dimethyl-4-hydroxy-4-pentanolactone
3,3-dimethyl-2-(3-pyrazolyl)levulinic acid
4,4 - dimethyl - 5-methylene-3-(3-pyrazolyl)pyrrolidone 3-(5-thiazolyl)-4,4,5-trimethyl-2-pyrrolidone Starting material: diethyl 2-(1,1-dimethylpropargyl)-2-(5-thiazolyl)malonate
Intermediates:
2 - carboxy-2-(5-thiazolyl)-3,3-dimethyl-4-hydroxy-4-pentanolactone
3,3-dimethyl-2-(5-thiazolyl)levulinic acid
4,4 - dimethyl-5-methylene-3-(5-thiazolyl)-2-pyrrolidone In the above examples, there are set forth a number of classes of intermediates, including 2-carboxy-2,3,3-tri-substituted-4-phentanolactones and 4,4-di-substituted-5-methylene-2-pyrrolidones. Both of these classes of intermediates are useful in the processes of this invention, the ultimate products of which are β,β-di-alkyl-substituted pyrrolidines whose utility has been set forth above.

We claim:
1. The process which comprises semi-hydrogenating in the presence of a noble metal catalyst a propargyl-substituted di-alkylmalonate represented by the following formula:

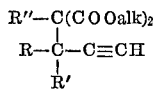

wherein

R and R', when taken separately, are members of the group consisting of $C_1$–$C_8$ alkyl and $C_3$–$C_8$ cycloalkyl;
R and R', when taken together with the carbon atom to which they are attached, form a $C_3$–$C_8$ cycloalkyl radical;
R" is a member of the group consisting of hydrogen, $C_1$–$C_8$ alkyl, $C_3$–$C_8$ cycloalkyl, monocyclic aromatic and monocyclic aromatic-substituted $C_1$–$C_8$ alkyl; and alk is a $C_1$–$C_8$ alkyl group;

thus forming an allyl-substituted malonate represented by the following formula:

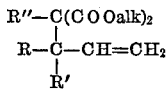

wherein R, R', R", and alk have the same meaning as hereinabove;

hydrolyzing said allyl malonate with base to yield the corresponding malonic acid represented by the following formula:

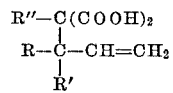

wherein R, R', and R" have the same meaning as hereinabove, decarboxylating said malonic acid with heat to form an unsaturated acid of the following formula:

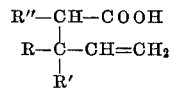

wherein R, R', and R" have the same meaning as hereinabove;

treating said unsaturated acid with mineral acid to form a lactone represented by the following formula:

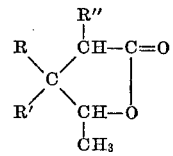

wherein R, R', and R" have the same meaning as hereinabove, treating said lactone with ammonia to yield the corresponding pyrrolidone represented by the following formula:

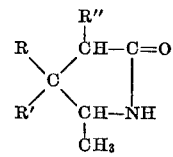

wherein R, R', and R" have the same meaning as hereinabove; and, then reducing said pyrrolidone with a metal hydride reducing agent to yield the corresponding β,β-di-alkyl-substituted pyrrolidine represented by the following formula:

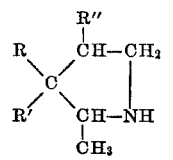

wherein R, R', and R" have the same meaning as hereinabove.

No references cited.

ALEX MAZEL, Primary Examiner

J. TOVAR, Assistant Examiner